United States Patent [19]

Oziomek et al.

[11] Patent Number: 5,446,102
[45] Date of Patent: Aug. 29, 1995

[54] OLEFIN METATHESIS CATALYSTS FOR DEGELLING POLYMERIZATION REACTORS

[75] Inventors: James Oziomek, Cuyahoga Falls; William L. Hergenrother, Akron, both of Ohio; David R. Hamm, Mountain View, Calif.; Thomas C. Bouton, Akron, Ohio

[73] Assignees: Bridgeston, Corporation; Catalytica, both of Tokyo, Japan

[21] Appl. No.: 288,381

[22] Filed: Aug. 10, 1994

[51] Int. Cl.⁶ ............................................. C08F 8/00
[52] U.S. Cl. ............................. 525/245; 525/313; 525/314; 525/315
[58] Field of Search ............... 525/245, 313, 314, 315

[56] References Cited

U.S. PATENT DOCUMENTS 3,995,095 11/1976 Short .
4,012,566 3/1977 Zelinski et al. .
4,501,857 2/1985 Kishimoto et al. .
4,681,956 7/1987 Schrock .
4,727,215 2/1988 Schrock .
5,087,710 2/1992 Schrock et al. .
5,110,885 5/1992 Wagener et al. .
5,5146,033 9/1992 Schrock et al. .
5,162,446 11/1992 Gibler et al. .
5,290,895 3/1994 Wagener et al. .

*Primary Examiner*—Bernard Lipman

[57] ABSTRACT

Depolymerization or molecular weight reduction of polymers and gelled polymers containing internal unsaturation along the polymer backbone is performed in the presence of a molybdenum or tungsten compounds having the structural formula:

$$M(NR_1)(OR_2)_2(CHR_3)$$

wherein M is molybdenum or tungsten;
$R_1$ and $R_2$ are unsubstituted or halo-substituted alkyl, aryl, aralkyl groups or silicon-containing analogs thereof;
$R_3$ is an alkyl, aryl, aralkyl group of any substituent that results from the initial reaction between the M=CHR₃ complex and an olefin treating agent.

16 Claims, No Drawings

OLEFIN METATHESIS CATALYSTS FOR DEGELLING POLYMERIZATION REACTORS

FIELD OF THE INVENTION

This invention relates to the use of a single component molybdenum or tungsten based olefin metathesis catalyst to reduce the molecular weight of conjugated diene polymers or copolymers, to produce oligomers from polymers, and to remove gelled polymers from polymerization reactors.

BACKGROUND OF THE INVENTION

A common problem occurring in the preparation of polymers of conjugated dienes or block copolymers of conjugated dienes and vinyl aromatic hydrocarbons is the removal of gelled polymer from the polymerization reactor following an extended continuous polymerization process. Previous attempts to depolymerize the polymer remaining in the reactor have met with only limited success by employing multi-component metathesis catalysts that require the additional use of ethyl aluminum sequichloride (EASC) and diethyl aluminum chloride (DEAC) or Lewis acids. The use of such compounds leads to polymer cross-linking and to reactor corrosion. Cross-linking quickly increases the molecular weight of a polymer. Such a molecular weight increase adversely affects the goal of molecular weight reduction sought from a depolymerization or degelling reaction. Thus, known metathesis catalyst systems possessing a high Lewis acidity are not useful for polymer weight reduction. Other known metathesis catalysts create environmental or safety problems. Furthermore, the use of any of the prior art metathesis catalysts to depolymerize polymers remaining in reactors necessitates the reconditioning of the reactors prior to their subsequent use.

OBJECTS OF THE INVENTION

It is an object of the present invention to provide a metathesis catalyst for the degelling or depolymerization of polymers having internal unsaturation in the polymer backbone.

It is a further object of the present invention to provide a method of decreasing the molecular weight of internally unsaturated polymers to produce lower molecular weight polymers and oligomers.

It is another object of the present invention to provide a metathesis catalyst system that can be used to remove gelled polymers from a reactor without necessitating the reconditioning of the reactor for use in subsequent polymerization reactions including subsequent changing of reaction processes between Ziegler-type polymerization reactions and lithium initiated polymerization reactions.

It is still another object of the present invention to provide a metathesis catalyst and a process for its use in depolymerizing internally unsaturated polymers in a reactor without the need for conventional steam treating and cleaning of the reactor prior to subsequent use of the reactor for additional polymerization reactions.

These and other objects of the present invention will become apparent to one skilled in the art from a study of the following disclosure and claims.

SUMMARY OF THE INVENTION

Degelling, depolymerization or molecular weight reduction of polymers containing internal unsaturation along the polymer backbone is performed in the presence of a molybdenum or tungsten compounds having the structural formula:

$M(NR_1)(OR_2)_2(CHR_3)$ wherein M is molybdenum or tungsten;

R$_1$ and R$_2$ are unsubstituted or halo-substituted alkyl, aryl, aralkyl groups or silicon-containing analogs thereof;

R$_3$ is an alkyl, aryl, aralkyl group of any substituent that results from the initial reaction between the M=CHR$_3$ complex and an olefin treating agent; and the above-discussed alkyl groups have 1–20 carbons, aryl groups have 6–20 carbons and aralkyl groups have 7–20 carbons. The depolymerization process is a preferably performed in the presence of an olefin monomer.

DETAILED DESCRIPTION OF THE INVENTION

The initial average primary (i. e., before branching and crosslinking) molecular weight of the polymer treated in accordance with the invention is in the range of from about 1,000 to about 10,000,000, preferably in the range of from about 10,000 to 500,000. The term "primary molecular weight" as used throughout this specification and the claims refers to the number-average molecular weight before cross-linking and gelation. As a practical matter, any method presently known in the art or hereinafter developed can be used to determine molecular weight and to observe the resulting modification of the molecular weight as a result of treatment in accordance with the invention. For example, it is convenient to determine the inherent viscosity of non-gelled polymers after treatment to observe the relative molecular weight change.

Any polymer which is capable of modification in molecular weight when treated in accordance with the invention can be employed. It is believed that the polymer must have sufficient internal unsaturation to undergo modification of the molecular weight. In theory, an average of at least one double bond in the carbon backbone per polymer molecule is necessary. As a practical matter those polymers containing an average of from about 0.05 to 1 internal double bond per monomer unit are preferred. The terms "internal double bond" and "double bond in the carbon backbone" excludes vinyl unsaturation. However, it is understood that the polymer treated in accordance with the invention can also have vinyl unsaturation. These internally unsaturated polymers employed in the invention can be defined using more descriptive terms, i.e., liquid, elastomeric and resinous polymers.

The polymer unsaturation can be determined by two separate techniques, iodine monochloride titration and infrared analyses. When appropriate, a combination of these techniques can be used. ICI titration is an art recognized general method for determining the level of carbon-carbon unsaturation in a wide variety of polymers. Results are expressed in terms of mmoles of ICI reacted with one gram of polymer. Thus, when one prepares a polymer containing from 0.05–1 double bonds per monomer unit, one can calculate the average number of carbon-carbon double bonds per molecule if the number average molecular weight is known. The ICI titration procedure measures total unsaturation, e.g., it does not distinguish between "internal" and "vinyl" unsaturation. However, even when the polymer has less than 0.05–1 double bonds per monomer unit, if the polymer undergoes modification of the molecular weight when treated according to the process of the invention, then inherently the polymer contains sufficient internal unsaturation.

The second method which can be employed to determine unsaturation is the art recognized procedure of infrared analyses. This method has particular utility for the preferred class of polymers treated according to the invention, i.e., homopolymers and copolymers of conjugated dienes. Infrared analysis is useful for determining the amount of 1,4-addition (internal unsaturation) in these polymers. Other known methods are also available for determining vinyl unsaturation.

The preferred polymers to be degelled, depolymerized, or reduced in molecular weight to oligomers according to the process of the invention are homopolymers of conjugated dienes containing 4–12 carbon atoms per molecule, copolymers of two or more dienes containing from 4–12 carbon atoms per molecule, and copolymers of dienes with vinyl monomers wherein the diene contains 4–12 carbon atoms per molecule. Unsaturated polymers of cyclic monoolefins such as cyclopentene are equally preferred. The copolymers of the conjugated dienes with the vinyl monomers contain at least 5 parts by weight of the diene per 100 parts by weight of the copolymer, such as high impact polystyrene can be used. Mixtures of diene homopolymers, mixtures of copolymers, or mixtures of homopolymers and copolymers can be employed in the process of the invention. In either case, the mixtures of diene homopolymers, the mixtures of diene copolymers, or the mixtures of diene homopolymers and diene copolymers advantageously have an average primary molecular weight of at least about 1000 to about 10,000,000, preferably 10,000 to 500,000.

Homopolymers of conjugated dienes containing from 4–12 carbon atoms per molecule can be prepared by any means known in the art. A suitable method for the preparation of the homopolymers is disclosed in U.S. Pat. No. 3,278,508. Exemplary homopolymers which can be employed in the process of the invention are homopolymers of:

1,3-butadiene, isoprene, 2,3-dimethyl-1,3-butadiene, 1,3-pentadiene-(piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 3-methyl-1,3-heptadiene, 3-octadiene, 3-butyl-1,3-octadiene, 3,4-dimethyl-1,3-hexadiene, 3-n-propyl-1,3-pentadiene, 4,5-diethyl-1,3-octadiene, 2-phenyl-1,3-butadiene, 2,3-diethyl-1,3-butadiene, 2,3-di-n-propyl-1,3-butadiene, 2-methyl-3-isopropyl-1,3-butadiene, and the like, as well as, suitable polymers obtained by ring opening polymerization of monomers like cyclopentene, cyclooctene, cyclooctadiene, norbornene and the like.

Conjugated dienes containing halogen and alkoxy substituents along the chain can also be employed such as chloroprene, fluoroprene, 2-methoxy-1,3-butadiene, 2-ethoxy-3-ethyl-1,3-butadiene, and 2-ethoxy-3-methyl-1,3-hexadiene.

Copolymers of conjugated dienes containing from 4–12 carbon atoms per molecule with vinyl monomers copolymerizable therewith can be prepared by any means known in the art. Exemplary vinyl monomers which can be used to form copolymers of conjugated dienes in the invention include:

aryl-substituted olefins, such as styrene, various alkyl styrenes, para-methoxystyrene, 1-vinylnaphthalene, and the like;

heterocyclic nitrogen-containing monomers, such as pyridine and quinoline derivatives containing at least one vinyl or alphamethyl-vinyl group, such as 2-vinylpyridine, 3-vinylpyridine, 4-vinylpyridine,3-ethyl-5-vinylpyridine,2-methyl-5-vinylpyridine, 3,5-diethyl-4-vinylpyridine, and the like;

similar mono- and di-substituted alkenyl pyridines and like quinolines;

acrylic acid esters, such as methyl acrylate, ethyl acrylate;

alkacrylic acid esters, such as methyl methacrylate, ethyl methacrylate, propyl methacrylate, ethyl ethacrylate, butyl methacrylate;

methyl vinyl ether, vinyl chloride, vinylidene chloride, vinylfuran, vinylcarbazole, vinylacetylene, and the like.

In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5ethylpyridine, and the like.

Throughout the specification and claims, the terms molecular weight reduction, degelling, depolymerization are used as a matter of choice and are used to describe the catalytic effect of the process of the present invention to reduce the length of the polymer chains of the present invention to form lower molecular weight polymers or oligomers.

Depolymerization or degelling catalysts that are useful in modifying polymers by depolymerization or by molecular weight reduction in the presence of a olefin treating agent are disclosed in U.S. Pat. Nos. 4,681,956 and 4,727,215, the disclosures of which are herein incorporated by reference. The depolymerization/degelling metathesis catalysts useful in the present invention are molybdenum or tungsten compounds having the structural formula:

$$M(NR_1)(OR_2)_2(CHR_3) \qquad (I)$$

wherein M is molybdenum or tungsten;

R_1 and R_2 are substituted or halo-substituted alkyl, aryl, aralkyl groups or derivatives of silicon-containing analogs thereof;

R_3 is an alkyl, aryl, aralkyl group of any substituent that results from the initial reaction between the M=CHR_3 complex and a olefin treating agent; and the above-discussed alkyl groups have 1–20 carbons, aryl groups have 6–20 carbons and aralkyl groups have 7–20 carbons.

The terms "aryl" and "ar" are employed here to denote a radical derived from a hydrocarbon, having solely aromatic unsaturation in six-membered carbocyclic rings, by removal of a hydrogen atom from a carbon atom of an aromatic ring. Examples of aryl groups are phenyl, 2,6-diisopropylphenyl and 2,4,6-trimethylphenyl. Examples of aralkyl groups are benzyl, 1-methyl-1-phenylethylbenzene and triphenylmethyl.

Examples of $R_1$ in Formula I are 2,6-diisopropylphenyl, 2,6-dimethylphenyl, 2,4,6-triisopropylphenyl, 2,4,6-trimethylphenyl, 2,6-di-tertiary-butylphenyl, ortho-tertiary-butylphenylpentafluorophenyl, pentafluorophenyl, phenyl, tertiary-butyltrimethylsilyl, triphenylmethyl, triphenylsilyl, tri-tertiarybutylsilyl, and perfluoro-2-methyl-2-pentyl. Preferred examples of $R_1$ in Formula I include 2,6-diisopropylphenyl, 2,6-diethylphenyl and 2,6-dimethylphenyl.

Examples of $R_2$ in Formula I are tert-butyl, trifluorotertbutyl $((CF_3)(CH_3)_2C)$, perfluoro-tert-butyl, perfluoro-2-methyl-2-pentyl, 2,6-diisopropylphenyl, 2-tert-butylphenyl, 2-isopropylphenyl, phenyl, 1-methyl-1-phenylethyl, 2,6-dimethylphenyl, 2,4,6-trimethylphenyl, 2,6-dichlorophenyl, pentafluorophenyl, trimethylsilyl, triphenylsilyl, tri-tert-butylsilyl, and hexafluoro-tert-butyl $((CF_3)_2(CH_3)C)$. Examples of concatenated $OR_2$ groups in Formula I are pinacolate, 2,6-dimethyl-2,6-heptanediolate and propane-1,3-diolate. Preferred examples of $R_2$ in Formula I include 2-tert-butylphenyl and hexafluoro-tert-butyl.

$R_3$ is initially an alkyl or an aryl group such as 1-methyl-1-phenylethyl, tert-butyl or phenyl. 1-Methyl-1-phenylethyl is a preferred example of $R_3$ in Formula I. Since the $M=CHR_3$ moiety of the compound of Formula I is intimately involved in the catalytic reaction, the $CHR_3$ ligand initially present is replaced as a consequence of the olefin metathesis reaction by any other alkylidene fragment from among the olefins that are being metathesized.

It is also recognized that one or more donor ligands such as ethers (diethyl ether, tetrahydrofuran, 1,2-dimethoxyethane) can be bound to M in the complex in the crystalline state, but in solution the donor ligands are lost spontaneously, or are displaced readily by the olefin(s) that is(are) being metathesized.

It is also recognized that metallacyclobutane complexes, the simplest of which is:

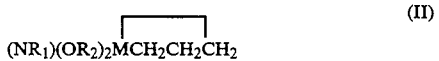

(II)

can also be utilized as catalysts for the molecular weight reduction reaction, as they are the crucial intermediates in said reaction, and are in equilibrium with the alkylidene complex and the free olefin as displayed in reaction equation 1 in U.S. Pat. No. 4,681,956. The position of the equilibrium in reaction equation 1, as shown in U.S. Pat. No. 4,681,956, depends upon the donor ability of the solvent medium, and in the more general case where alkyl or functionalized substituents are present in the metallacyclobutane and alkylidene complexes, upon the electronic and steric properties of those substituents.

When $R_3$ is tert-butyl, the catalyst can be prepared by the sequence of reactions shown in equations 2-4 in U.S. Pat. No. 4,681,956. These reactions can be conducted in diethyl ether, pentane or toluene solvent at a temperature between $-78°$ C. and $25°$ C. The products are recovered by filtering the reaction mixture and removing all solvents and readily volatile products from the filtrate in vacuo.

The above-identified depolymerization/degelling metathesis catalysts are preferably employed to modify the polymers in the presence of an olefin treating agent. These catalysts are homogeneous catalysts that are capable of depolymerization, degelling or molecular weight reduction of the polymer in the presence of a liquid diluent. Of course, if the olefin treating agent is liquid under normal reaction conditions, it can function as a diluent for the catalyst.

Lower molecular weight olefins employed as olefin treating agents in the process of the invention are non-tertiary, nonconjugated acyclic mono- and polyenes having at least 2 carbon atoms per molecule including cycloalkyl, cycloalkenyl, and aryl derivatives thereof; cyclic mono- and polyenes having at least 4 carbon atoms per molecule including alkyl and aryl derivatives thereof, mixtures of the above olefins; and mixtures of ethylene and the above olefins. Many useful reactions are accomplished with such acyclic olefins having 2-30 carbon atoms per molecule and with such cyclic olefins having 4-30 carbon atoms per molecule. Non-tertiary olefins are those olefins having at least one double bond wherein the carbon atoms which are attached to each other by means of the double bond, are also attached to at least one hydrogen atom.

Some specific examples of acyclic olefins suitable for reactions of this invention include ethylene, propylene, 1-butene, 2-butene, 1-pentene, 2-pentene, 1-hexene, 1,4-hexadiene, 2-heptene, 1-octene, 2,5-octadiene, 2-nonene, 1-dodecene, 2-tetradecene, 1-hexadecene, 3-methyl-1-butene, 1-phenyl-2-butene, 4-octene, 3-eicosene, 3-heptene, 3-hexene, 1,4-pentadiene, 1,4,7-dodecatriene, 2-methyl-4-octene, 4-vinylcyclohexene, 1,7-octadiene, 1,5-eicosadiene, 2-triacontene, 2,6-dodecadiene, 1,4,7,10,13-octadecapentaene, 8-cyclopentyl-4,5-dimenthyl-1-decene, 6,6-dimethyl-1,4-octadiene, styrene, substituted styrenes and the like, and mixtures thereof.

Some specific examples of cyclic olefins suitable for the reactions of this invention are cyclobutene, cyclopentene, cycloheptene, cyclooctene, 5-n-propylcyclooctene, cyclodecene, cyclododecene, 3,3,5,5-tetramethylcyclononene, 3,4,5,6,7pentaethylcyclodecene,1,5-cyclooctadiene,1,5,9-cyclododecatriene, 1,4,7,10-cyclododecatetraene, 6-methyl-6-ethylcyclooctadiene-1,4, and the like, and mixtures thereof.

Lower molecular weight materials such as ethylene, propylene, butenes, pentenes, and hexenes are most frequently employed, but the choice of olefin is governed by the type of diene polymer treated and the results desired. A preferred olefin treating agent is 2-butene. Single olefins or mixed olefins can be used in the process. The amount of olefin utilized as a treating agent is governed by the results desired with a particular polymer being treated. It is generally in the range of 5 to 100 parts by weight per 100 parts by weight of the polymer.

In general, the degelling/depolymerization is carried out in a suitable solvent at a temperature within the range of from about 0° to about 120° C., preferably about 20° to about 90° C. Metathesis catalyst concentrations within the range from about 0.01 mm(millimoles) per 100 grams of polymer to about 20 mM per 100 grams of polymer, are generally used. These catalytic amounts are regarded as being catalytically effective amounts.

When the metathesis catalyst is employed in the presence of an anionic initiator, e.g. an alkyllithium such as n-butyllithium, it is preferable to employ at least a 0.5 molar ratio of metathesis catalyst to anionic initiator, most preferably a molar ratio of at least 0.75.

The metathesis catalyst, olefin treating agent and the polymer are generally contacted at degradation conditions for a period in the range from about 10 minutes to about 18 hours. Suitable solvents for conducting the degelling/degradation include, among others, aliphatic, cycloaliphatic, and aromatic solvents including n-heptane, n-pentane, tetrahydrofuran, cyclohexane, toluene, hexane, and benzene. Because of the small amounts of the metathesis catalyst present in the polymer after degelling/degradation, it is not necessary to separate the catalyst and the catalyst residue from the polymer after degelling or degradation. However, if separation is desired, it may be carried out using methods well known in the prior art. The degradation may be carried out in batch processes, continuous processes or semi-batch processes.

The various depolymerization or degelling catalysts can exhibit different optimum reaction temperatures, pressures, and contact times for the modification reaction. Generally, the preferred temperature, pressure, and the time for modification reaction will be substantially the same as the optimum conditions at which the depolmerization/degelling catalyst is used for olefin disproportionation of lower molecular weight acyclic olefins. In instances when the optimum temperature for the depolymerization or degelling by the disproportionation reaction is higher than about 250° F., the polymer is preferably treated with a solution of an inert diluent.

The process of modifying the molecular weight of an internally unsaturated polymer is carried out by contacting the polymer with the selected depolymerization/degelling metathesis catalyst, preferably in the presence of the olefin treating agent. The polymer can be in the form of a solvent swollen gel or in solution. When the polymer has been prepared in solution in the presence of an organometallic catalyst, the depolymerization metathesis catalyst can be used immediately after polymerization without the need to inactivate the polymerization catalyst by adding the depolymerization metathesis catalyst and olefin treating agent to the reactor. A previously prepared polymer may also be treated with a suitable diluent and subsequently contacted with the depolymerization/degelling metathesis catalyst and an olefin treating agent to prepare oligomers by reducing the molecular weight of the polymer or to simply aid in the removal of waste polymer from a reactor.

The depolymerizing/degelling metathesis catalyst system can be used in a reactor without the need for conventional steam treating and high pressure water cleaning and re-conditioning of the reactor prior to the use of the reactor for subsequent polymerization reactions whether the polymerization reactions are alternating from anionic initiated polymerization to Zeigler catalyst initiation or vice versa. Generally additional polymerization reactions can be conducted in a reactor after the reactor is treated with the metathesis catalyst after the reactor is simply rinsed out with a solvent.

While the examples below relate to methods of olefin metathesis depolymerization of polyolefins using catalysts containing molybdenum in accordance with embodiments of the present invention, it is to be understood that corresponding tungsten complexes can be similarly employed using the methods of the present invention. Further, it is to be understood that other catalysts capable of catalyzing the olefin metathesis reaction of standard acyclic olefins, and substantially free of Lewis acidity and the related catalysis of vinyl addition reactions, can also be similarly employed using the methods of the present invention.

In the following examples the polymers were prepared in septum-sealed, nitrogen purged, glass reaction vessels. Depolymerization was conducted utilizing the displayed amounts of molybdenum catalyst in the presence the polymerization initiator utilized for polymerization. The molybdenum catalyst used as a metathesis catalyst in each of the following examples was 2,6-diisopropylphenylimido neophylidene molybdenum bis(2-tertbutylphenoxide having the structural formula:

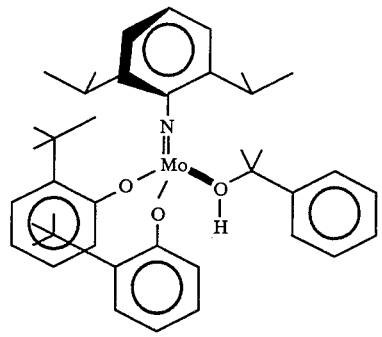

EXAMPLES 1 to 4

Cis-Polybutadienes of high molecular weight and containing a 18.4% gel were prepared in glass bottles using a Nickel II based initiator system in hexane. Weighed amounts of the same polymerizing cement were transferred to each of the four reactions described in Table I. Polymerization was conducted at room temperature for a period of 15 to 18 hours. The amounts of polybutadiene and polymer cement prepared in each bottle in each example is displayed in Table I.

The bottles were then charged with dried, mixed 2-butene and molybdenum catalyst in amounts displayed in Table I and maintained at room temperature for time periods ranging from 15 minutes to 16 hours as shown in Table 1. The contents of each bottle was then treated with either isopropanol (Examples 1-2) or methanol (Examples 3-4) display the following characteristics. The liquid contents of the bottle of Example 1 appeared to be a cloudy alcohol while the liquid contents of the bottle of Example 2 was in the form of a clear alcohol layer. The liquid contents of the bottle of Example 3 appeared as two separate layers, namely, a clear alcohol layer and a clear oil layer. The liquid contents of the bottle of Example 4 also appeared as two separate layers, namely, a clear alcohol layer and a cloudy oil layer.

The contents of each bottle were vacuum dried overnight at 0.1 mm/~35° C. and the recovered product displayed the properties shown in Table I. As displayed in Table I, when the molar ratio of molybdenum catalyst to total polymerization catalyst was between 1.0 and 1.5, the polymer and gel depolymerized into low molecular weight oligomers within 15–20 minutes, while when this ratio was 0.5 some depolymerization occurred. The small yield of isolated polymer in Example 3 indicated major molecular weight reduction; i.e., most of the sample was volatile at 35° C. and 0.1 mm pressure.

EXAMPLES 5 TO 7

In Examples 5 to 7 a gel from a continuous reactor containing 85.5% by weight of cross-linked polybutadiene was depolymerized in accordance with the procedure of Examples 1 to 4 utilizing an amount of molybdenum catalyst and mixed 2-butenes as shown in Table II. After the polymer gel was mixed with the molybdenum catalyst and allowed to react for the length of time displayed in Table II, all of the polymer gel in each bottle in Examples 5 to 7 was completely dissolved. The presence of unreacted butadiene inhibited polymer degelling, while divinylbenzene did not.

EXAMPLES 8 TO 11

In Examples 8 to 11, a polymerizing polymer cement was added to each bottle to generate cross-linked styrene-butadiene rubber with n-butyllithium initiator and a modifier. Degelling occurred in accordance with the procedure of Examples 1 to 4 as displayed in Table III. Furthermore, each of the quantities of dissolved polymers contained a significant amount of volatile material thereby displaying a rather low molecular weight.

EXAMPLE 12

A two gallon reactor was found to contain 2.063 liters of gel. A sample of the gel, swollen with excess hexane, indicated that the gel in the reactor consisted of 703 grams of cross-linked styrenebutadiene rubber and 859 grams of hexane (45% rubber). The gel was treated with 454 grams of butene and 1750 mg of a molybdenum catalyst, i.e. 1.13 gm Mo catalyst (1.61 mmole) per lb of rubber in hexane to fill the reactor. The gel after standing overnight and drying of solvent contained only three percent rubber by weight indicating a much more swollen, less tightly gelled, rubber.

EXAMPLES 13 TO 19

Further reactants and metathesis depolymerization/-degelling conditions and results are displayed in Table IV as Examples 13 to 19. These examples were conducted in a 1450 ml nominal capacity reactor operated at about 20 percent capacity in accordance with the procedures of Examples 1 to 4. Each example was conducted consecutively in ascending numerical order with only a hexane rinse of the reactor between examples. These examples clearly indicate that, after cleaning the reactor with the depolymerizing/degelling catalyst system of the present invention, a switch from anionic initiators to transition metal catalysts and vice versa can successfully occur with only a solvent rinse between reaction types.

TABLE I

| | cis-Polybutadiene Bottle Metathesis | | | |
|---|---|---|---|---|
| Example No. | 1 | 2 | 3 | 4 |
| Polymer Cement$^a$ (gms) | 14.60 | 11.80 | 12.60 | 14.10 |
| Expected Polybutadiene (gms) | 2.96 | 2.40 | 2.56 | 2.86 |
| Polymerization Overnight at Room Temperature (RT) | | | | |
| Metathesis: | | | | |
| Mixed 2-Butenes (gms) | 2.60 | — | 2.30 | 2.30 |
| Mo Catalyst$^b$ (gm) | 0.072 | — | 0.187 | 0.139 |
| polymer/Mo (weight) | 41.10 | — | 13.70 | 20.60 |
| Mo/Pzn Cat. (molar) | 0.50 | — | 1.50 | 1.00 |
| Conditions: | | | | |
| Time at RT | overnight | — | 15–20 min | 30 min |
| Workup: | | | | |
| Alcohol | IPA | IPA | MeOH | MeOH |
| Observations: | cloudy alcohol | clear alcohol | 2 liquid layers; Clear ROH, Clear oil | 2 liquid layers; Clear ROH, Cloudy oil |
| Vacuum dry hydrocarbon layers overnight at 0.1 mm/~35° C. | | | | |
| Yield (gm) | 2.71 | 2.24 sticky | 0.33 oil | 2.53 oil |
| Excess Polymer (gm) (found-expected) | −0.25 | −0.16 | −2.23 | −0.33 |
| DSV$^c$ | 2.19 | 3.78 | — | — |
| % gel | 0.20 | 18.40 | — | — |
| GPC: | | | | |
| Mn × 10$^{-3}$ | 67.00 | 156.9 | 0.627 | 1.03 |
| % Styrene$^d$ | — | — | 10.60 | 6.30 |

$^a$Polyneized overnight at room temperature.
$^b$0.0071 gm/ml in cyclohexane.
$^c$Dilute solution viscosity in toluene.
$^d$Apparent, Incorporation of catalyst residues.

TABLE II

Metathesis Bottle Depolymerization of Gelled$^a$ and Dried Diene Rubber Obtained from a Continuous Reactor
1.0 gm vacuum dried gel

| Example No. | 5 | 6 | 7 |
|---|---|---|---|
| gms. Hexane | 28.90 | 30 | 31.10 |
| Additive (mmoles) | — | 0.059$^b$ | 4.57$^c$ |
| Mixed 2-Butenes (gm) | 4.23 | 4.07 | 3.22 |
| Mo$^d$ Catalyst (gm) | 0.014 | 0.014 | 0.014/0.014 |
| polymer/Mo (weight) | 71.40 | 71.40 | 71.40/35.70 |
| Conditions: | | | |
| Time at RT | 40 min | 40 min | 20 hrs.; 4 hrs. at 50° C./50° C. over weekend |
| Observations: | all polymers dissolved | | |

$^a$X-linking agent unknown, 85.5% gel.
$^b$Divinyl benzene
$^c$1.0 gm. 24.7% Bd/Hexane blend. This corresponds to 0.77% residual Bd.
$^d$In hexane at 0.008 gm/ml, not completely soluble.

TABLE III

| | SBR$^a$ Metathesis | | | |
|---|---|---|---|---|
| Example No. | 8 | 9 | 10 | 11 |
| Weight (gm): | | | | |
| Polymer Cement (gm) | 17.60 | 15.50 | 18.00 | 17.60 |
| SBR | 4.31 | 3.80 | 4.41 | 4.31 |
| Divinyl benzene (mmoles) | 0.066 | 0.058 | 0.067 | 0.066 |
| Modifier (mmoles) | 0.012 | 0.01 | 0.012 | 0.012 |
| n-BuLi (mmoles) | 0.033 | 0.029 | 0.034 | 0.033 |
| Polymerization overnight at Room Temperature | | | | |
| Metathesis: | | | | |
| Mixed 2-Butenes (gms) | 2.08 | — | 2.19 | 2.10 |
| Mo Catalyst (gm)$^b$ | 0.036 | — | 0.072 | 0.108 |
| polymer/Mo (weight) | 119.70 | — | 61.30 | 39.90 |
| Mo/(Init. + Mod.)$^c$ | 1.14 | — | 2.24 | 3.44 |
| Conditions: | | | | |
| Time at RT$^d$ | overnight | — | overnight | overnight |
| Workup: | | | | |
| Alcohol | IPA | IPA | MeOH | MeOH |
| Observations: | cloudy IPA + polymer | clear | trace gel, 2 clear layers | 2 clear layers |
| Vacuum dry hydrocarbon layers overnight at 0.1 mm/~35° C. | | | | |
| Yield (gm) | 4.85 sticky | 4.63 | 2.98 oil | 2.14 oil |
| Excess Polymer (gm) (found-expected) | 0.54 | — | −1.43 | −2.17 |
| % gel | 91.70 | 98.70 | — | — |
| GPC: | | | | |
| Mn × 10$^{-3}$ | — | — | 1.37 | 0.728 |
| % Styrene | — | — | 30.00 | 31.80 |

$^a$19.5% Styrene.
$^b$In hexane at 0.008 gm/ml, not completely soluble.
$^c$Molar ratio.
$^d$Reaction appears complete long before time stated.

TABLE IV

| Example No. | 13 | 14 | 15 | 16[d] | 17 | 18 | 19 |
|---|---|---|---|---|---|---|---|
| | Reactor Metathesis | | | | | | |
| | Li-Bd | | SBR | | cis-Br | Li-Bd | |
| gm 23.8% Bd/Hexane | 273.3 | 270.8 | 149.2 | 148 | 211.30 | 206.2 | 195.3[f] |
| gm 33% Sty/Hexane | — | — | 31.5 | 31.10 | — | — | — |
| gm Hexane | — | ~70 | 16.6 | 20 | — | 71.8 | — |
| mmoles Modifier | 0.02 | 0.02 | 0.01 | 0.01[a] | — | — | 0.015 |
| mmoles DVB | 0.73 | — | 0.71 | — | — | — | 0.50 |
| mmoles n-BuLi | 0.62 | 0.62 | 0.34 | 0.34 | — | 0.5 | 0.50 |
| DVB/Li | 1.18 | 0 | 2.09 | 0 | — | — | 1.00 |
| mmoles Ni++ | — | — | — | — | 0.03 | — | — |
| Ni/Al/B | — | — | — | — | 1/20/20 | — | — |
| Primary MW ($M_n \times 10^{-3}$) | 105 | 104 | 135 | 133 | — | 98 | 100 |
| GPC Found ($M_n \times 10^{-3}$) | — | 105 | — | 219 | — | 132 | — |
| $M_w/M_n$ | — | 1.17 | — | 1.53 very tight gel; expelled much solvent | — | 1.22 | — |
| gm 2-butene | 99 | — | 76.70 | — | 102.2 | — | 26 |
| mmoles Mo catalyst[b] | <1.37[c] | — | 1.01 | — | 1.27 | — | 0.42 |
| gms cyclohexane | <88 | — | 49.8 | — | 30 | — | 100 |
| weight from reactor (gm) | 419.2 | 57.2[e] | 292.5[a] | 45[e] | 336 | 45.6 | — |
| weight charged (gm) | 462 | 64.4 | 325 | 45.5 | 343 | 49.0 | — |
| gm Mo Cat./lb Polymer | <6.71 | — | 7.01 | — | 8.05 | — | 2.67 |

[a]Probably not enough to randomize styrene and DVB; Block styrene may be sludge in reactor.
[b]Added in increments.
[c]Some catalyst lost in one addition.
[d]Bottle run, control for Example 15.
[e]Dried polymer.
[f]25.7% Bd.

What is claimed is:

1. A process for decreasing the molecular weight of a polymer having internal carbon-carbon unsaturation in the polymer backbone comprising:
   contacting said polymer with a lower molecular weight olefin in the presence of a metathesis catalyst for a time period sufficient to decrease the molecular weight of said polymer,
   wherein said metathesis catalyst is represented by the formula;

$M(NR_1)(OR_2)_2(CHR_3)$ wherein M is molybdenum or tungsten;
   $R_1$ and $R_2$ are independently selected unsubstituted or halo-substituted alkyl, aryl, aralkyl groups or silicon-containing analogs thereof; and
   $R_3$ is an alkyl, aryl or aralkyl group or a substituent resulting from the reaction between the $M=CHR_3$ moiety of said metathesis catalyst and said lower molecular weight olefin.

2. The process according to claim 1 wherein said lower molecular weight olefin comprises a non-tertiary nonconjugated acyclic mono- or polyene having 2 to 30 carbon atoms per polymer.

3. The process according to claim 2 wherein the polymer has an initial weight average molecular weight of about 1,000 to about 10,000,000 and an average of about 0.05 to about 1 internal double bond per monomer unit incorporated into the polymer.

4. The process according to claim 2 wherein the polymer is a polymer of at least one conjugated diene or a copolymer of at least one conjugated diene and at least one vinyl monomer.

5. The process according to claim 1 wherein the polymer is polybutadiene.

6. The process according to claim 4 wherein the copolymer is a styrene-butadiene rubber.

7. The process according to claim 1 wherein the metathesis catalyst is 2,6-diisopropylphenylimido neophylidene molybdenum bis(2-tert-butylphenoxide).

8. The process according to claim 1 wherein the polymer is contacted with the metathesis catalyst having a catalyst concentration ranging from about 0.01 mM to about 20 mM per 100 grams of polymer and the contacting takes place for a period of time within the range from about 10 minutes to about 18 hours.

9. A process for degelling a polymer in the form of a gel wherein the polymer contains internal carbon-carbon unsaturation comprising:
   contacting said gelled polymer with a lower molecular weight olefin in the presence of a metathesis catalyst for a time period sufficient to decrease the molecular weight of said polymer,
   wherein said metathesis catalyst is represented by the formula;

$M(NR_1)(OR_2)_2(CHR_3)$ wherein M is molybdenum or tungsten;
   $R_1$ and $R_2$ are independently selected unsubstituted or halo-substituted alkyl, aryl, aralkyl groups or silicon-containing analogs thereof; and
   $R_3$ is an alkyl, aryl or aralkyl group or a substituent resulting from the reaction between the $M=CHR_3$ moiety of said metathesis catalyst and said lower molecular weight olefin.

10. The process according to claim 9 wherein said lower molecular weight olefin comprises a non-tertiary nonconjugated acyclic mono- or polyene having 2 to 30 carbon atoms per polymer.

11. The process according to claim 9 wherein the gelled polymer has an initial primary number average molecular weight of about 1,000 to about 10,000,000 and an average of about 0.05 to about 1 internal double bond per monomer unit incorporated into the polymer.

12. The process according to claim 9 wherein the gelled polymer is a polymer of at least one conjugated diene or a copolymer of at least one conjugated diene and at least one vinyl monomer.

13. The process according to claim 9 wherein the gelled polymer is polybutadiene.

14. The process according to claim 12 wherein the gelled copolymer is a styrene-butadiene rubber or high impact polystyrene.

15. The process according to claim 9 wherein the metathesis catalyst is 2,6-diisopropylphenylimido neophylidene molybdenum bis(2-tert-butylphenoxide).

16. The process according to claim 9 wherein the gelled polymer is contacted with the metathesis catalyst having a catalyst concentration ranging from about 0.01 mM to about 20 mM per 100 grams of polymer and the contacting takes place for a period of time within the range from about 10 minutes to about 18 hours.

* * * * *